United States Patent
Spoldi

(10) Patent No.: US 10,353,402 B2
(45) Date of Patent: Jul. 16, 2019

(54) VECTOR LIMITING OF A ROTOR CONTROL VOLUME

(71) Applicant: SIKORSKY AIRCRAFT CORPORATION, Stratford, CT (US)

(72) Inventor: Steven E. Spoldi, Shelton, CT (US)

(73) Assignee: SIKORSKY AIRCRAFT CORPORATION, Stratfrod, CT (US)

( * ) Notice: Subject to any disclaimer, the term of this patent is extended or adjusted under 35 U.S.C. 154(b) by 310 days.

(21) Appl. No.: 15/501,130

(22) PCT Filed: Jun. 22, 2015

(86) PCT No.: PCT/US2015/036876
§ 371 (c)(1),
(2) Date: Feb. 1, 2017

(87) PCT Pub. No.: WO2016/039834
PCT Pub. Date: Mar. 17, 2016

(65) Prior Publication Data
US 2017/0220047 A1    Aug. 3, 2017

Related U.S. Application Data

(60) Provisional application No. 62/043,480, filed on Aug. 29, 2014.

(51) Int. Cl.
*G05D 1/08* (2006.01)
*B64C 27/00* (2006.01)
(Continued)

(52) U.S. Cl.
CPC ......... *G05D 1/0833* (2013.01); *B64C 27/008* (2013.01); *B64C 27/06* (2013.01); *B64C 27/54* (2013.01); *G05D 1/0858* (2013.01)

(58) Field of Classification Search
CPC .. G05D 1/0833; G05D 1/0858; B64C 27/008; B64C 27/06; B64C 27/54
See application file for complete search history.

(56) References Cited

U.S. PATENT DOCUMENTS

| 4,115,755 A | 9/1978 | Cotton |
| 5,213,282 A | 5/1993 | Gold et al. |

(Continued)

OTHER PUBLICATIONS

Bramwell, et al.; Bramwells Helicopter Dynamics. [online] Second Edition Published by Butterworth-Heinemann 2001. [retrived on Feb. 5, 2016] URL: http://rahauav.com/Library/Multirotors/Bramwell's%20Helicopter%20Dynamics-www.RahaUAV.com, p. 37.
(Continued)

*Primary Examiner* — Basil T. Jos
(74) *Attorney, Agent, or Firm* — Cantor Colburn LLP

(57) ABSTRACT

A method and system for vector limiting of a rotor control volume for a helicopter with one or more controllers configured to issue a displacement command during a flight maneuver and a computer operably connected to the one or more controllers and configured to receive signals with a processor indicative of a displacement command for a rotor during a flight maneuver; determine with the processor an origination point for a command vector in a reference frame; determine with the processor the command vector in the reference frame; determine with the processor a command radius for the command vector; compare with the processor the command radius with values of estimated command radii in a look-up table; and determine with the processor a control volume limited command in response to the comparing of the command radius with the estimated command radius.

14 Claims, 4 Drawing Sheets

(51) Int. Cl.
 *B64C 27/06* (2006.01)
 *B64C 27/54* (2006.01)

(56) References Cited

U.S. PATENT DOCUMENTS

| | | |
|---|---|---|
| 5,222,691 A | 6/1993 | Gold et al. |
| 5,607,122 A | 3/1997 | Hicks et al. |
| 7,440,857 B2 | 10/2008 | Morel |
| 7,548,800 B2 | 6/2009 | Jones et al. |
| 8,290,683 B2 | 10/2012 | Luppold |
| 2004/0093130 A1 | 5/2004 | Osder et al. |
| 2005/0147495 A1 | 7/2005 | Bittner |
| 2005/0151672 A1 | 7/2005 | Augustin et al. |
| 2008/0075591 A1 | 3/2008 | Builta |
| 2012/0072056 A1 | 3/2012 | Hasan et al. |
| 2012/0221156 A1 | 8/2012 | Fuller et al. |
| 2013/0221153 A1 | 8/2013 | Worsham, II et al. |
| 2013/0325218 A1 | 12/2013 | Spoldi |

OTHER PUBLICATIONS

International Search Report and Written Opinion; International Application No. PCT/US2015/036876, Internationa; Filing Date: Feb. 6, 2016; dated Feb. 23, 2016; 14 Pages.

VECTOR LIMITING OF A ROTOR CONTROL VOLUME

CROSS REFERENCE TO RELATED APPLICATIONS

This application is a National Stage application of PCT/US2015/036876, filed Jun. 17, 2015, which claims the benefit of U.S. Provisional Application No. 62/043,480, filed Aug. 29, 2014, both of which are incorporated by reference in their entirety herein.

STATEMENT REGARDING FEDERALLY SPONSORED RESEARCH OR DEVELOPMENT

This invention was made with Government support with the United States Navy under Contract No. N00019-06-C-0081. The Government therefore has certain rights in this invention.

FIELD OF THE INVENTION

The subject matter disclosed herein relates generally to the field of rotorcraft controls and, in particular, to an advanced rotor control algorithm that utilizes vector command limiting in spherical and cylindrical coordinate frames for a rotor control volume.

DESCRIPTION OF RELATED ART

Typically, a swashplate in a rotorcraft directs motion from a pilot cyclic and collective stick into motion of a rotor and its rotor blades. However, the rotor has limits on longitudinal, lateral and collective commands, which define a control volume for the rotor. In some cases, pilot cyclic and collective command points cause the rotor to move too far beyond the limits of the control volume for safe flight. Conventional control volume limiting for rotor controls relies on evaluation of specific equations representing system constraints in order to stay within the control volume. As the complexity of the constraints increase, these equations are not sufficient to optimally position rotor controls within the control volume, maximize performance or maintain control volume limits. In addition, these equations are complex and require excessive logic and computation time to execute in order to arrive at an optimal position for the rotor. Further, pilot controls that move the command point beyond the control volume requires elaborate calculations in order to arrive at a command point on the surface of the control volume. A control law that utilizes vector command limiting for rotor control that is significantly lower in complexity would be well received in the art.

BRIEF SUMMARY

According to one aspect of the invention, a method for vector limiting of a rotor control volume for a helicopter includes receiving signals with a processor indicative of a displacement command for a rotor during a flight maneuver; determining with the processor an origination point for a command vector in a reference frame; determining with the processor the command vector in the reference frame; determining with the processor a command radius for the command vector; comparing with the processor the command radius with values of estimated command radii in a look-up table; and determining with the processor a control volume limited command in response to the comparing of the command radius with the estimated command radius.

In addition one or more of the features described above, or as an alternative, further embodiments could include determining the origination point in one of a spherical coordinate frame or a cylindrical coordinate frame.

In addition one or more of the features described above, or as an alternative, further embodiments could include comparing the command radius with an estimated command radius as a function of command heading.

In addition one or more of the features described above, or as an alternative, further embodiments could include comparing the command radius with a maximum estimated command radius.

In addition one or more of the features described above, or as an alternative, further embodiments could include determining the control volume limiting command from an interpolated value of the estimated command radius while the command radius is less than the maximum estimated command radius.

In addition one or more of the features described above, or as an alternative, further embodiments could include determining the control volume limited command from a scaled estimated command radius the maximum estimated command radius while the command radius is greater than the maximum estimated command radius.

In addition one or more of the features described above, or as an alternative, further embodiments could include determining the control volume limited command for a control volume of the rotor.

According to another aspect of the invention, control system for vector limiting of a rotor control volume for a helicopter, includes one or more controllers configured to issue a displacement command during a flight maneuver; a computer operably connected to the one or more controllers and configured to: receive signals with a processor indicative of a displacement command for a rotor during a flight maneuver; determine with the processor an origination point for a command vector in a reference frame; determine with the processor the command vector in the reference frame; determine with the processor a command radius for the command vector; compare with the processor the command radius with values of estimated command radii in a look-up table; and determine with the processor a control volume limited command in response to the comparing of the command radius with the estimated command radius.

In addition one or more of the features described above, or as an alternative, further embodiments could include determining the origination point in one of a spherical coordinate frame or a cylindrical coordinate frame.

In addition one or more of the features described above, or as an alternative, further embodiments could include comparing the command radius with an estimated command radius as a function of command heading.

In addition one or more of the features described above, or as an alternative, further embodiments could include comparing the command radius with a maximum estimated command radius.

In addition one or more of the features described above, or as an alternative, further embodiments could include determining the control volume limiting command from an interpolated value of the estimated command radius while the command radius is less than the maximum estimated command radius.

In addition one or more of the features described above, or as an alternative, further embodiments could include determining the control volume limited command from a scaled estimated command radius the maximum estimated command radius while the command radius is greater than the maximum estimated command radius.

In addition one or more of the features described above, or as an alternative, further embodiments could include determining the control volume limited command for a control volume of the rotor.

According to another aspect of the invention, a helicopter having an airframe; a main rotor with a plurality of rotor blades; and a control system for vector limiting of a control volume of the rotor in the helicopter, includes one or more controllers configured to issue a displacement command during a flight maneuver; a computer operably connected to the one or more controllers and configured to: receive signals with a processor indicative of a displacement command for a rotor during a flight maneuver; determine with the processor an origination point for a command vector in a reference frame; determine with the processor the command vector in the reference frame; determine with the processor a command radius for the command vector; compare with the processor the command radius with values of estimated command radii in a look-up table; and determine with the processor a control volume limited command in response to the comparing of the command radius with the estimated command radius.

In addition one or more of the features described above, or as an alternative, further embodiments could include wherein the computer is configured to determining the origination point in one of a spherical coordinate frame or a cylindrical coordinate frame.

In addition one or more of the features described above, or as an alternative, further embodiments could include a computer that is configured to compare the command radius with an estimated command radius as a function of command heading.

In addition one or more of the features described above, or as an alternative, further embodiments could include a computer that is configured to compare the command radius with a maximum estimated command radius.

In addition one or more of the features described above, or as an alternative, further embodiments could include a computer that is configured to determine the control volume limiting command from an interpolated value of the estimated command radius while the command radius is less than the maximum estimated command radius.

In addition one or more of the features described above, or as an alternative, further embodiments could include a computer that is configured to determine the control volume limited command from a scaled estimated command radius the maximum estimated command radius while the command radius is greater than the maximum estimated command radius.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
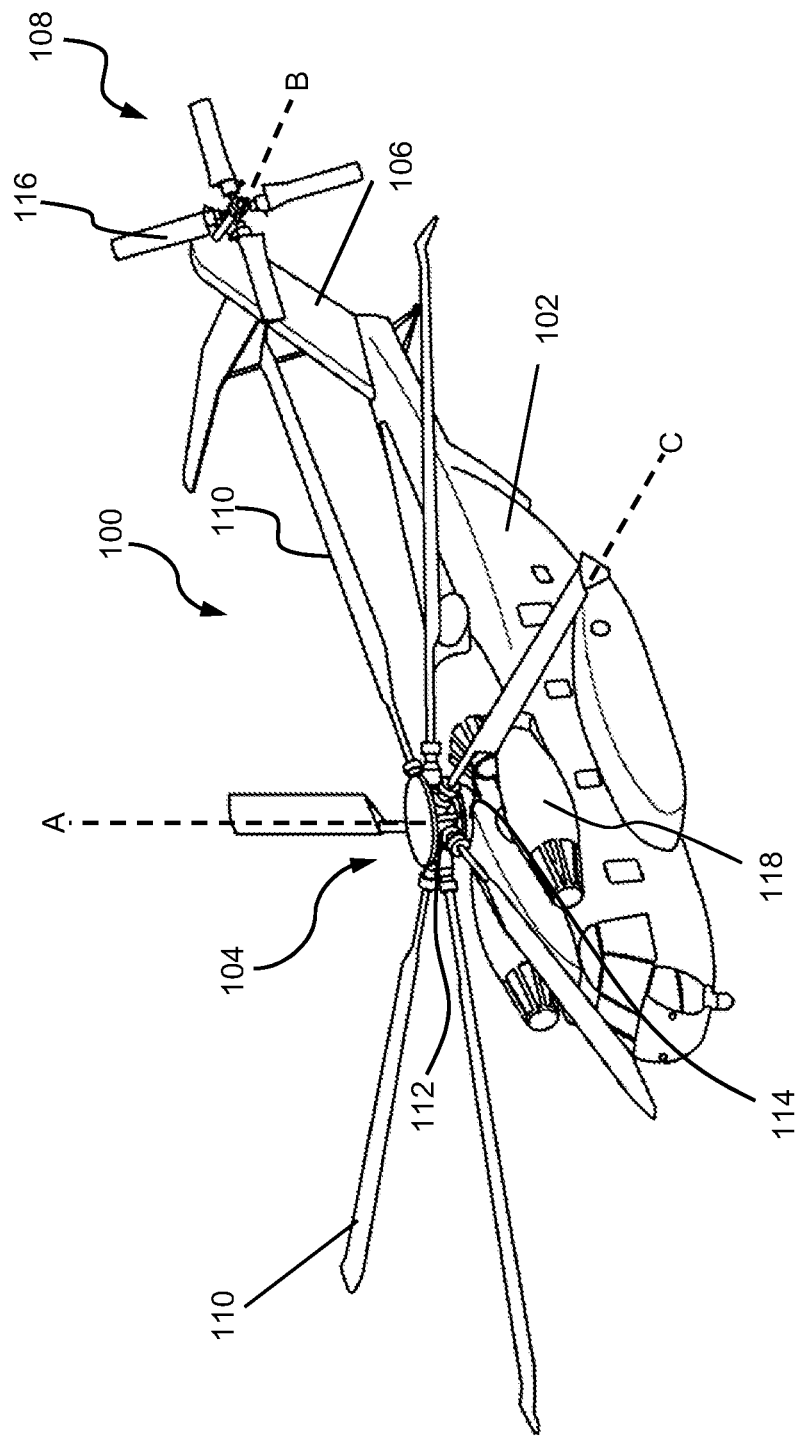
FIG. 1 is a perspective view of an exemplary aircraft for use with embodiments of the invention.

Referring now to the drawings, FIG. 1 illustrates a general perspective view of an exemplary vehicle in the form of a vertical takeoff and landing (VTOL) rotary-wing aircraft 100 for use with a control volume limiting algorithm for optimal position and control of a rotor according to an embodiment of the invention. In an embodiment, the control volume limiting algorithm utilizes a look-up table and interpolation techniques are used to determine control volume limited commands for optimal positioning of the rotor needed for stability and control of aircraft 100. As illustrated, rotary-wing aircraft 100 includes an airframe 102 having a main rotor 104 and an extending tail 106 which mounts an anti-torque system, such as a tail rotor 108. In embodiments, the anti-torque system may include a translational thrust system, a pusher propeller, a rotor propulsion system, or similar. The main rotor 104 includes a plurality of rotor blades 110 mounted to a rotor hub 112 that rotates about rotor axis A while tail rotor 108 includes a plurality of rotor blades 116 that rotates about axis B. Main rotor 104 is connected to a conventional swashplate 114 which is driven by one or more control servos to move and/or tilt the swashplate 114 with respect to the rotor axis A. For example, the swashplate 114 may be commanded to move along rotor axis A so as to cause the blades 110 to vary pitch collectively relative to a blade axis C. Also, tilting of the swashplate 114 either longitudinally or laterally relative to the axis A will cause the blades 110 to pitch cyclically in respective longitudinal or lateral directions relative to the blade axis C. Main rotor 104 and tail rotor 108 are driven to rotate by one or more engines 118 through one or more gearboxes (not shown). Although a particular helicopter is illustrated and described in the disclosed embodiment, other rotorcraft configurations and/or machines, such as high speed compound rotary wing aircraft with supplemental translational thrust systems, dual contra-rotating, coaxial rotor system aircraft, tilt-rotors and tilt-wing aircraft, fixed wing aircraft, and wind-turbines will also benefit from embodiments of the invention.

Figure 2:
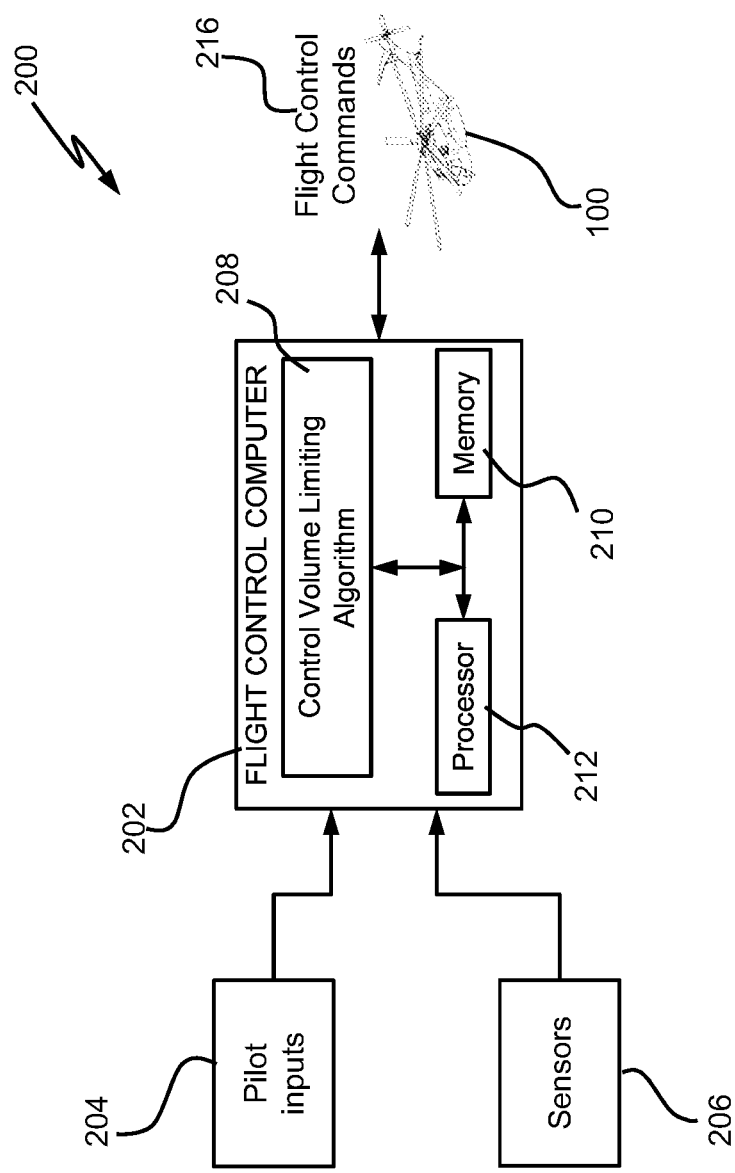
FIG. 2 is a schematic view of an exemplary system for implementing an algorithm for control volume limiting of a rotor according to an embodiment of the invention.

FIG. 2 illustrates an exemplary schematic block diagram of a model following control system 200 for implementing the embodiments described herein. The model following control system 200 is implemented with a control volume limiting algorithm 208 in order to determine a control volume limited command as actual flight control commands 216 for control of servos of rotor 104. Control volume limiting algorithm 208 is at least based on pilot inputs as collective and cyclic commands to main rotor 104 in order to provide control authority to the aircraft 100. In embodiments, control volume limiting can be implemented in a reference frame. In embodiments, the reference frame can include spherical or cylindrical coordinate frames.

In control system 200, pilot inputs 204, for example, from a controller such as a pilot collective and/or cyclic stick are received by flight control computer 202 (FCC 202) as commanded pitch or roll rates. Pilot inputs 204 include commands to control a direction of flight, for example, roll, pitch or the like. A number of sensors 206 are located on helicopter 100 to sense flight parameters of helicopter 100 such as pitch and/or roll angular velocities, pitch and/or roll angular accelerations, vertical acceleration, airspeed, air density, or the like. Control system 200 includes a FCC 202 that automatically determines commands as a function of a main rotor control volume and commanded collective and cyclic rates in order to produce a desired flight control command 216 as a control volume limited command. In an embodiment, FCC 202 includes a memory 210. Memory 210 stores control volume limiting algorithm 208 as executable instructions that is executed by processor 212. The instructions may be stored or organized in any manner and at any level of abstraction, such as in connection with the execution of control volume limiting algorithm 208. The algorithm when executed by processor 204, enables the computer system 200 to perform the features of the invention as discussed herein Processor 212 may be any type of processor (CPU), including a general purpose processor, a digital signal processor, a microcontroller, an application specific integrated circuit, a field programmable gate array or the like. Also, in embodiments, memory 210 may include random access memory (RAM), read only memory (ROM), or other electronic, optical, magnetic or any other computer readable medium onto which is stored the control volume limiting algorithm 208 described below.

Figure 3:
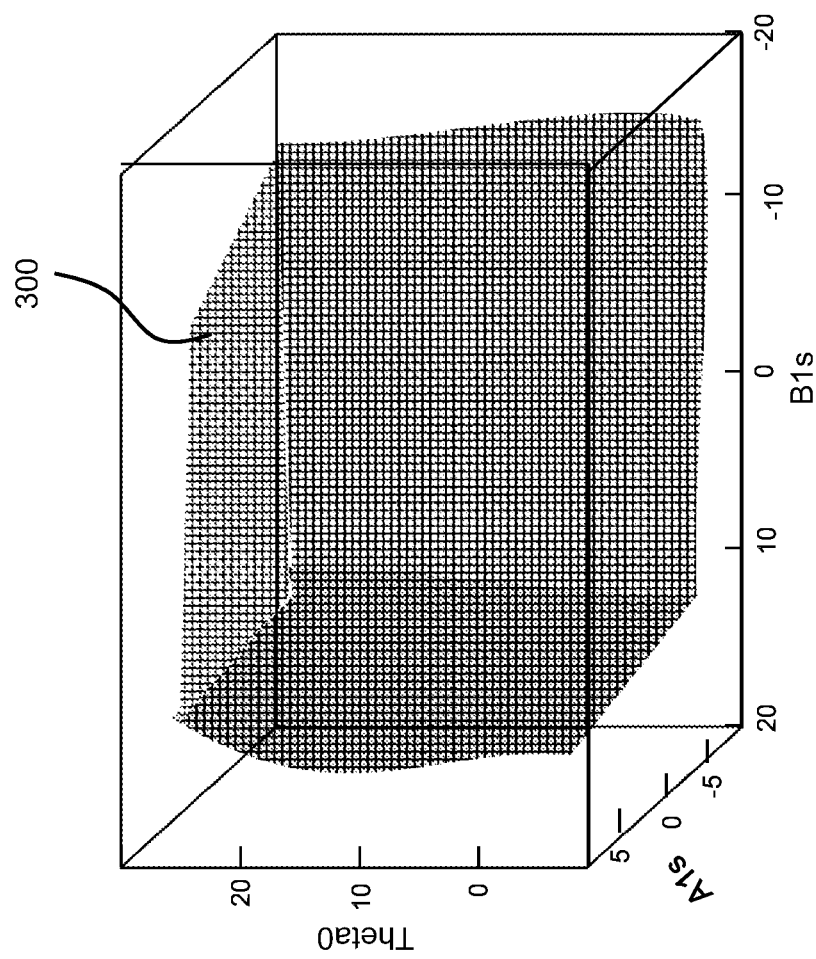
FIG. 3 is an exemplary mapped control volume that defines limits for longitudinal and lateral cyclic and collective commands for a rotor of the exemplary aircraft of FIG. 1 according to an embodiment of the invention.

FIG. 3 is an exemplary control volume 300 for a rotor of aircraft 100 of FIG. 1 according to an embodiment of the invention. Control volume 300 for aircraft 100 can be derived in either a spherical coordinate frame or a cylindrical coordinate frame and is a three-dimensional (3D) representation of minimum and maximum limits for travel/motion of the rotor in the longitudinal, lateral, and vertical directions for longitudinal cyclic commands (A1s), lateral cyclic commands (B1s), and collective commands (Theta0). Boundaries of control volume 300 represent maximum limits from the origin of control volume 300 for command set (e.g., A1s, B1s, Theta0) that were generated from a command radius map as a function of ψ (command heading) and Theta0 (collective commands).

Figure 4:
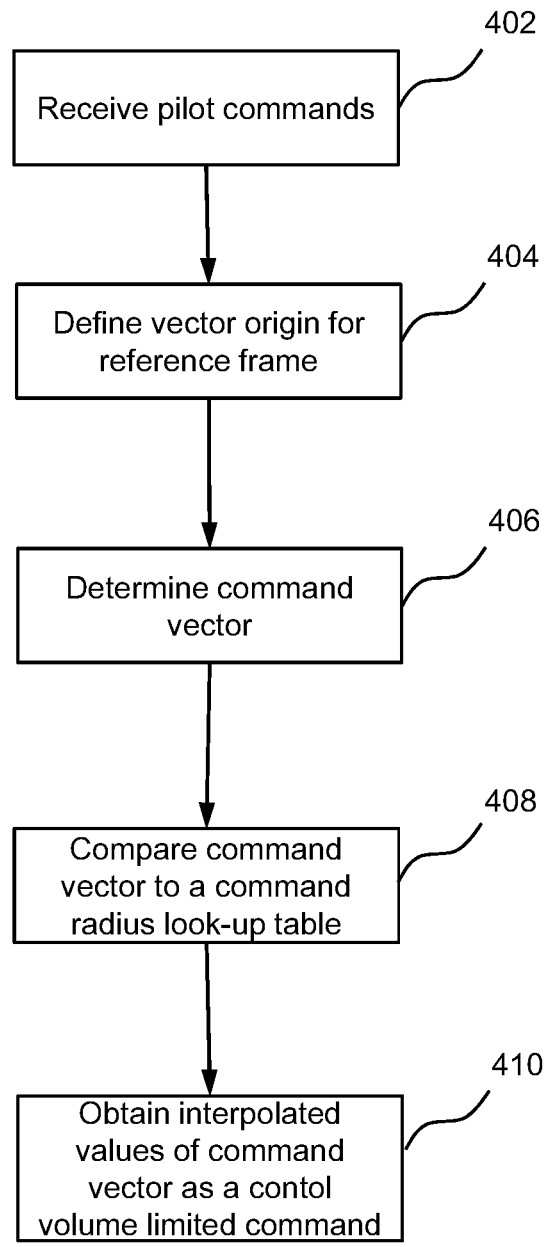
FIG. 4 is a flow chart of a process for control volume vector limiting according to an embodiment of the invention.

FIG. 4 is an exemplary flowchart of a process for control volume vector limiting of an example helicopter rotor 104 (FIG. 1) according to an embodiment of the invention. The exemplary process implements a model based control volume limiting algorithm 208 that utilizes vector command limiting on a control volume 300 with interpolation through a look-up table and is implemented in a cylindrical coordinate frame. Alternatively, the control volume algorithm 208 can also be implemented in a spherical coordinate frame for determining control volume limited commands for implementation by helicopter 100 (FIG. 1). The control volume limiting algorithm 208 uses control volume 300 and is executed by the processor 212 of computer system 200 (FIG. 2). As such, FIGS. 2 and 3 are also referenced in the description of the exemplary process of FIG. 4.

As shown, the exemplary process is initiated at 402 where a pilot command is received by FCC 202 from pilot inputs 204. The command can include a collective command, a longitudinal cyclic command, and/or a lateral cyclic command (e.g., A1s, B1s, Theta0). In 404, an origination point is determined for control volume in a reference frame. In an example, the center of the control volume 300 is defined as the vector origin for a limiting command vector. For an example cylindrical reference frame, vector origin (A0, B0, Theta0) can be defined as:

$$(A0, B0, Theta0) = (A1s, B1s) \text{ at point of desired point of origin and Theta0position} \quad (1)$$

In 406, command vectors are calculated or determined from the pilot command set (A1s, B1s, Theta0) according to equations (2)-(5). The command vector is determined from a length/magnitude of the command and a command heading. The command vector is plotted within the reference frame with the tail of the command vector originating from the vector origin and the head of the command vector being determined from the length/magnitude of the command and the command heading. Next, a command radius for the command vector is determined. In a non-limiting example, the command radius is a radial distance in the spherical or cylindrical coordinate frame.

Compute Control Volume Command Vectors from Input Command Set (A1s, B1s)

$$A1 = A1s - A0; \quad (2)$$

$$B1 = B1s - B0 \quad (3)$$

Compute ψ, θ, and Command Radius (r)

$$r = (A1^2 + B1^2)^{1/2} \quad (4)$$

$$\psi = \tan^{-1}(B1, A1) \quad (5)$$

In 408, the command vector with its command radius is compared to values stored in a command radius look-up table for determination of a control volume limited command according to equations (6)-(9). The command radius look-up table stores values of radial distance of vectors as a function of command heading from the origin to each surface of the control volume as an estimated command radius. In embodiments, for a spherical coordinate frame, the look-up table stores values for a radial distance of vectors from the origin of the control volume as a function of polar angle and azimuth angle and, for a cylindrical coordinate frame, the look-up table stores values of radial distance of vectors from the origin of the control volume as a function of angular position and height. Also, the look-up table stores a maximum radial distance of vectors from the origin to the surface of the control volume as maximum estimated command radius. The command radius for the command vector is compared to the estimated command radius for the same heading.

Find Nearest Neighbors in the Maximum Command Radius Look-Up Table (R)

$$n\psi = \text{floor}((\psi - \pi)/d\psi) \quad (6)$$

$$n\psi 2 = n\psi + 1 \quad (7)$$

$$n\text{Theta0} = \text{floor}((\text{Theta0} - \text{minTheta0})/d\text{Theta0}) \quad (8)$$

$$n\text{Theta02} = n\text{Theta0} + 1 \quad (9)$$

In 410, an interpolated value for a stored command radius at the same heading (which represents a command vector from the origin along the same direction as the pilot command in the control volume) is returned as an actual control volume limited command if the command radius is within the control volume. But, if command radius is greater than the maximum command radius, the maximum stored command radius along the same heading (which represents a scaled command radius at the control volume surface) is returned as the control volume limited command according to equations (10)-(17).

Interpolate to Find Maximum Allowable Command Radius (r)

$$k\psi=(n\psi2-(\psi-\pi))/d\psi \quad (10)$$

$$k\text{theta}0=(n\text{theta}0-(\text{Theta}0-\text{mintheta}0))/d\text{theta}0 \quad (11)$$

$$R=k\psi*(R(n\psi,n\text{theta}0)*k\text{theta}0+R(n\psi,n\text{theta}0+1)*(1-k\text{theta}0))+(1-k\psi)*(R(n\psi+1,n\text{theta}0)*k\text{theta}0+R(n\psi+1,n\text{theta}0+1)*(1-k\text{theta}0)) \quad (12)$$

If Command Radius is Greater than Maximum Allowed, Appropriately Scale Command $$\text{If } (r>R) \quad (13)$$

$$A1=A1*R/r \quad (14)$$

$$B1=B1*R/r \quad (15)$$

Calculate A1s, B1s, and Theta0 as a Control Volume Limited Command $$A1s=A1+A0 \quad (16)$$

$$B1s=B1+B0 \quad (17)$$

The control volume limited command is applied to the main rotor 104 (FIG. 1) in order to provide control authority to the rotor main rotor 104 (FIG. 1) for aircraft 100 as described above.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangements not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for vector limiting of a rotor control volume for a helicopter, comprising:
   receiving signals with a processor indicative of a displacement command for a rotor during a flight maneuver;
   determining with the processor an origination point for a command vector in a reference frame;
   determining with the processor the command vector in the reference frame;
   determining with the processor a command radius for the command vector;
   comparing with the processor the command radius with values of estimated command radii in a look-up table; and
   determining with the processor a control volume limited command in response to the comparing of the command radius with the estimated command radius.

2. The method of claim 1, further comprising determining the origination point in one of a spherical coordinate frame or a cylindrical coordinate frame.

3. The method of claim 1, further comprising comparing the command radius with an estimated command radius as a function of command heading.

4. The method of claim 1, further comprising comparing the command radius with a maximum estimated command radius.

5. The method of claim 4, further comprising determining the control volume limiting command from an interpolated value of the estimated command radius while the command radius is less than the maximum estimated command radius.

6. The method of claim 4, further comprising determining the control volume limited command from a scaled estimated command radius the maximum estimated command radius while the command radius is greater than the maximum estimated command radius.

7. The method of claim 1, further comprising determining the control volume limited command for a control volume of the rotor.

8. A control system for vector limiting of a rotor control volume for a helicopter, comprising:
   one or more controllers configured to issue a displacement command during a flight maneuver;
   a computer operably connected to the one or more controllers and configured to:
   receive signals with a processor indicative of a displacement command for a rotor during a flight maneuver;
   determine with the processor an origination point for a command vector in a reference frame;
   determine with the processor the command vector in the reference frame;
   determine with the processor a command radius for the command vector;
   compare with the processor the command radius with values of estimated command radii in a look-up table; and
   determine with the processor a control volume limited command in response to the comparing of the command radius with the estimated command radius.

9. The control system of claim 8, wherein the computer is configured to determine the origination point in one of a spherical coordinate frame or a cylindrical coordinate frame.

10. The control system of claim 8, wherein the computer is configured to compare the command radius with an estimated command radius as a function of command heading.

11. The control system of claim 8, wherein the computer is configured to compare the command radius with a maximum estimated command radius.

12. The control system of claim 11, wherein the computer is configured to determine the control volume limiting command from an interpolated value of the estimated command radius while the command radius is less than the maximum estimated command radius.

13. The control system of claim 11, wherein the computer is configured to determine the control volume limited command from a scaled estimated command radius the maximum estimated command radius while the command radius is greater than the maximum estimated command radius.

14. The control system of claim 8, wherein the computer is configured to determine the control volume limited command for a control volume of the rotor.

* * * * *